United States Patent [19]

Foglar

[11] Patent Number: 5,559,959
[45] Date of Patent: Sep. 24, 1996

[54] METHOD FOR TRANSMITTING MESSAGE CELLS VIA REDUNDANT VIRTUAL PATH PAIRS OF AN ATM COMMUNICATION NETWORK

[75] Inventor: Andreas Foglar, Munich, Germany

[73] Assignee: Siemens Aktiengesellschaft, Munich, Germany

[21] Appl. No.: 303,941

[22] Filed: Sep. 9, 1994

[30] Foreign Application Priority Data

Sep. 16, 1993 [DE] Germany .......................... 43 31 579.8

[51] Int. Cl.$^6$ .................................................. H04L 12/56
[52] U.S. Cl. ................................................. 395/183.19
[58] Field of Search ............................... 395/575, 183.19, 395/280, 286, 856, 858, 881, 885; 371/8.2, 20.1; 340/826, 827; 364/284.3, 284.4; 370/54, 13, 91, 119; 455/39, 67.1, 225, 899; 379/457

[56] References Cited

U.S. PATENT DOCUMENTS

| | | | |
|---|---|---|---|
| 4,985,889 | 1/1991 | Frankish et al. | 370/94.1 |
| 5,084,867 | 1/1992 | Tachibana et al. | 370/60 |
| 5,153,920 | 10/1992 | Danner | 380/48 |
| 5,185,736 | 2/1993 | Tyrrell et al. | 370/55 |
| 5,200,950 | 4/1993 | Foglar et al. | 370/16 |
| 5,239,537 | 8/1993 | Sakauchi | 370/16 |
| 5,265,091 | 11/1993 | van Landegem | 370/60 |
| 5,271,004 | 12/1993 | Proctor et al. | 370/60 |
| 5,278,849 | 3/1994 | Hall | 371/57.1 |
| 5,278,977 | 1/1994 | Spencer et al. | 395/575 |
| 5,317,561 | 5/1994 | Fischer et al. | 370/16 |
| 5,325,358 | 6/1994 | Goeldner | 370/60 |
| 5,333,131 | 7/1994 | Tanabe et al. | 370/54 |
| 5,394,398 | 2/1995 | Rau | 370/60.1 |
| 5,398,235 | 3/1995 | Tsuzuki et al. | 370/16 |
| 5,402,415 | 3/1995 | Turner | 370/60 |
| 5,414,696 | 5/1995 | Tsuzuki et al. | 370/16 |
| 5,457,678 | 10/1995 | Goeldner | 370/13 |

FOREIGN PATENT DOCUMENTS

| | | |
|---|---|---|
| 2063936 | 9/1992 | Canada . |
| 0506396 | 9/1992 | European Pat. Off. . |
| 0542233 | 5/1993 | European Pat. Off. ........ H04L 12/56 |

OTHER PUBLICATIONS

"Hitless Line Protection Switching Method for ATM Networks", H. Ohta et al., IEEE International Conference on Communications ICC, 1993, pp. 272–276.

*Primary Examiner*—Robert W. Beausoliel, Jr.
*Assistant Examiner*—Stephen C. Elmore
*Attorney, Agent, or Firm*—Hill, Steadman & Simpson

[57] ABSTRACT

For transmitting message cells via virtual path pairs respectively formed of two separate paths (AP, EP), it is provided that a separate, internal cell header for each of the paths of a path pair is placed in front of every accepted message cell at least by a switching network (CCa) located at the beginning of the respective path pair. These internal cell headers have a plurality of header parts corresponding in number to the plurality of switching stages of the respective switching network. Given the appearance of a message cell, the header parts of the internal cell headers that are allocated to one another and that are intended for the respective switching stage are compared to one another by each of the switching stages of the respective switching network (CCa). Based on the criterion of the result of the comparison, the associated message cell is then either forwarded unmodified or is duplicated. The two message cells resulting therefrom are then forward via separate routes within the respective switching network in conformity with the header parts of the two internal cell headers that come into consideration.

4 Claims, 3 Drawing Sheets

```
┌─────────────────────────────────────────────────────────────┐
│ Arriving of a message cell at the multi-stage switching     │
│ network                                                     │
└─────────────────────────────────────────────────────────────┘
                              │
                              ▼
┌─────────────────────────────────────────────────────────────┐
│ Providing two separate internal cell headers for the        │
│ message cell on the basis of a cell header belonging        │
│ to this message cell, each of the internal cell headers     │
│ containing a header part for each of the stages,            │
│ putting these internal cell headers at the head of the      │
│ message cell                                                │
└─────────────────────────────────────────────────────────────┘
                              │                     ────(A)
                              ▼                    │
┌─────────────────────────────────────────────────────────────┐
│ Occurrence of a message cell at a stage of the              │
│ switching network                                           │
└─────────────────────────────────────────────────────────────┘
                              │
                              ▼
┌─────────────────────────────────────────────────────────────┐
│ Comparing the header parts of the two internal cell         │
│ headers allocated to the stage                              │
└─────────────────────────────────────────────────────────────┘
        │
        │   ┌─────────────────────────────────────────────────┐
        │   │ If identity of the header parts is given then   │
        └──▶│ forwarding the message cell according to the    │
            │ identical header parts                          │
            └─────────────────────────────────────────────────┘
                                    │
                                   (A)
            ┌─────────────────────────────────────────────────┐
            │ If non-identity of the header parts is given    │
            │ then duplicating the message cell, separately   │
            │ forwarding each of the message cells            │
            │ resulting therefrom according to one of the     │
        ┌──▶│ header parts, with this forwarding retaining the│
            │ header parts following this one of header parts │
            │ and belonging to the same internal cell header  │
            │ unmodified, but marking the header parts of     │
            │ the other internal cell header as invalid       │
            └─────────────────────────────────────────────────┘
                                    │
                                   (A)
            ┌─────────────────────────────────────────────────┐
            │ If one of the header parts is marked as invalid │
        ┌──▶│ then forwarding the message cell according to   │
            │ the remaining valid header part                 │
            └─────────────────────────────────────────────────┘
                                    │
                                   (A)
```

FIG 4

METHOD FOR TRANSMITTING MESSAGE CELLS VIA REDUNDANT VIRTUAL PATH PAIRS OF AN ATM COMMUNICATION NETWORK

BACKGROUND OF THE INVENTION

The present invention is directed to a method for message cells via redundant virtual path pairs of an ATM communication network.

ATM communication networks offer the possibility a plurality of virtual connections into bundles which are also referred to as virtual paths. Since such a virtual path can contain, for example, up to 65,536 virtual connections and can also have a high aggregate bit rate or, for example, up to 2.4 Gbit/s, the virtual path is expediently fashioned as a redundant virtual path pair having two separate virtual paths proceeding over different routes in order to maintain the information flow in case of a malfunction, that is, given outage of one of the paths of a path pair.

SUMMARY OF THE INVENTION

It is an object of the present invention to provide an improved method for transmitting message cells via the different routes defined for a respective virtual path pair.

In general terms the method of the present invention is a method for transmitting message cells via redundant virtual path pairs respectively formed of two separate paths in an ATM communication network that operates according to an asynchronous transfer mode. The network has a plurality of multi-stage switching networks, whereby the message cells to be transmitted via such a virtual path pair are duplicated by a switching network lying at the beginning of the respective path pair. The message cells allocated to one another are separately transmitted via the paths belonging to the respective path pair. At least the switching network lying at the beginning of the respective path pair precedes each of the accepted message cells with a separate, internal cell header for the two paths according to the criterion of the cell header respectively belonging thereto. A plurality of header parts corresponding in number to the plurality of switching stages are contained in the separate internal cell headers in the sequence of the switching stages to be traversed in the respective switching network. The route through the respective switching stage is respectively defined by this plurality of header parts. Each of the switching stages of the respective switching network compares the header parts of the internal cell headers intended for the respective switching stage and allocated to one another given the appearance of a message cell. Given an identity of the header parts compared to one another, the associated message cell is forwarded based on the criterion of the identical header parts. Given a non-identity of the header parts compared to one another, the associated message cell is duplicated. The two message cells resulting therefrom are separately forwarded according to the criterion of one of the header parts compared to one another. With this individual forwarding, the header parts following the respective header part and belonging to the same internal cell header are retained unmodified. However, the header parts of the other internal cell header are marked as invalid. The appertaining message cell is forwarded only based on the criterion of the remaining valid header part when one of the header parts compared to one another is marked as being invalid.

The advantage of the present invention is that, given multistage switching networks, the individual message cells are duplicated with little control outlay for a transmission via a path pair, being duplicated in that switching stage of the respective switching networks wherein the two different transmission paths in fact branch. The additional load on the respective switching network by the duplicated message cells thus remains minimal.

An especially low control outlay derives when in the method of the present invention, following every comparison of two header parts allocated to one another, the respective switching stage marks these as being invalid. A respective validity bit is attached to the header parts contained in the two internal cell headers that precedes each of the message cells to be transmitted. The validity bit is initially set to a defined, logical level as a validity mark of the respective header part. The message cells to be forwarded by a switch element of a switching stage are first intermediately stored in a central memory belonging to the respective switch element and have output queues allocated thereto. Given a required forwarding of a message cell via different routes, this message cell is respectively read out from the central memory when the information, contained in the output queues coming into consideration for the forwarding, indicates that this message cell is the next message cell to be forwarded.

In a further expedient development of the present invention, the method of the present invention is implemented in all switching networks lying within the respective path pair. In this way, the control devices involved in the transmission of message cells can be identically fashioned in all switching networks.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements and in which:

FIG. 4 is a flow chart depicting the steps of the method of the present invention.

DESCRIPTION OF THE PREFERRED EMBODIMENTS

Figure 1:
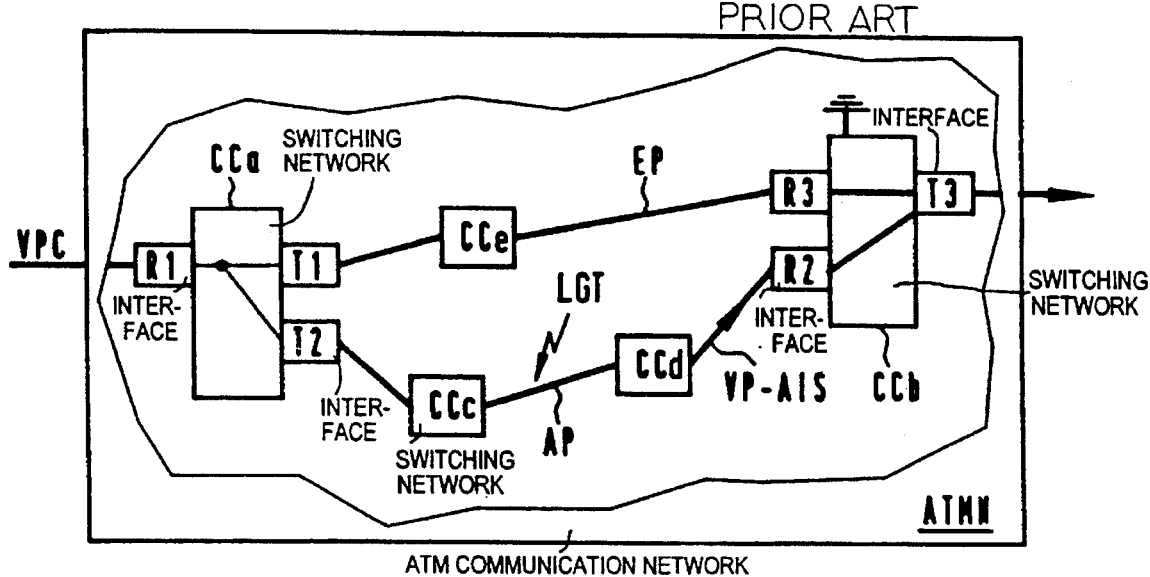
FIG. 1 is a block diagram showing portions of an ATM communication network wherein the present invention is employed.

FIG. 1 shows portions of an ATM communication network ATMN operating according to an asynchronous transfer mode that is formed of a plurality of switching networks and serves, for example, as an offering network for larger ATM switching networks. Within this ATM communication network, virtual connections that proceed in the same direction and that are set up in a known way are conducted via what are referred to as virtual paths, that is, these virtual paths each respectively carry a plurality of virtual connections. Let the switching networks thereby be fashioned, for example, as what are referred to as "cross connects" by which virtual paths are permanently set up and remain over a long time. Since such a virtual path can contain, for example, up to 65,536 virtual connections and can also have a high aggregate bit rate of, for example, 2.4 Gbit/s, such a path must be capable of being switched to an alternate route as quickly as possible in case of a malfunction in order to assure an optimally low loss of message cells transmitted within the individual virtual connections. For this purpose, an alternate path is defined within the ATM communication network for each path referred to below as an active path. The respective active path and the associated alternate path are referred to below as path pair. The active path and the appertaining alternate path thereby proceed via separate routes in order to achieve a high degree of reliability against outage. For example, insofar as possible the same optical fiber bundle within the ATM communication network is not employed for these two paths.

Representing a plurality of virtual path pairs proceeding within the ATM communication network, FIG. 1 schematically shows a virtual path pair established between two switching networks CCa and CCb. The switching network CCa resides at the start of the virtual path pair and is supplied at an interface means R1 with the message cells appearing within an offering path VPC. The active path AP proceeds from the switching network CCa via an interface means T2 connected thereto and via two transit switching networks CCc CCd to an interface means referenced R2 of the switching network CCb. The appertaining alternate path EP, by contrast, is established via an interface means T1 belonging to the switching network CCa and via a transit switching network CCe to an interface means R3 of the switching network CCb. As shall also be set forth below, the message cells supplied to the switching network CCa via the interface means R1 are respectively duplicated and the message cells allocated to one another are transmitted to the switching network CCb separately via the active path and via the alternate path. In the normal case, the message cells transmitted via the alternate path are discarded in this switching network CCb and only the message cells transmitted via the active path are forwarded to an interface means T3 which represents an output of the switching network CCb. Only given the appearance of disturbances on the active path is a switch made to the appertaining alternate path, that is, the message cells arriving via this alternate path are now forwarded to the interface means T3 whereas the message cells potentially still arriving via the active path are suppressed.

This duplication of the message cells within the switching network CCa shall be discussed first below with reference to FIG. 2. For this purpose, it is assumed that the switching networks of the ATM communication network and, thus, the switching network CCa as well are each respectively fashioned multi-stage and that the message cells are transmitted within the respective switching network according to what is referred to as the self-routing principle. According to this principle, an internal cell header is placed in front of each message cell upon entry thereof into the respective switching network, being attached thereto in addition to the existing, external cell header and based on the criterion of this cell header. This internal cell header has a plurality of header parts corresponding in number to the plurality of switching stages of the respective switching network, the route through the respective switching stage, that is, for example, the output of the switching stage, being respectively defined by these header parts. The sequence of the header parts thereby corresponds to the sequence in which the switching stages of the respective switching network, the switching network CCa in this case, are to be traversed.

It is then provided in the present exemplary embodiment that each of the message cells is preceded by two internal cell headers, namely one cell header for the active path and the other cell header for the alternate path. Every header part thereby has a validity bit attached to it which is initially set to a defined logical level, for example to the logical level "1".

Upon passage of a message cell through, for example, the switching network CCa, the header parts of the two internal cell headers allocated to a switching stage are compared to one another in each switching stage. Given an identity of these header parts, the appertaining message cell is forwarded to the following switching stage based on the criterion of the route information contained in the identical header parts, that is, based on the criterion of the designation of the output to be used. The validity bits of the header parts just compared are thereby destroyed. Given a non-identity of the header parts compared to one another, by contrast, the message cell present at the moment is duplicated. The two message cells resulting therefrom are then forwarded over different routes within the respective switching stage according to the criterion of one of the two header parts.

The validity bits are thereby destroyed in the header part that was just considered for the forwarding as well as in the header parts of the respectively other internal cell header. Finally, the appertaining message cell is forwarded only based on the criterion of the routing information contained in a valid header part when one of the header parts compared to one another is marked as being invalid (validity bit is destroyed).

Figure 2:
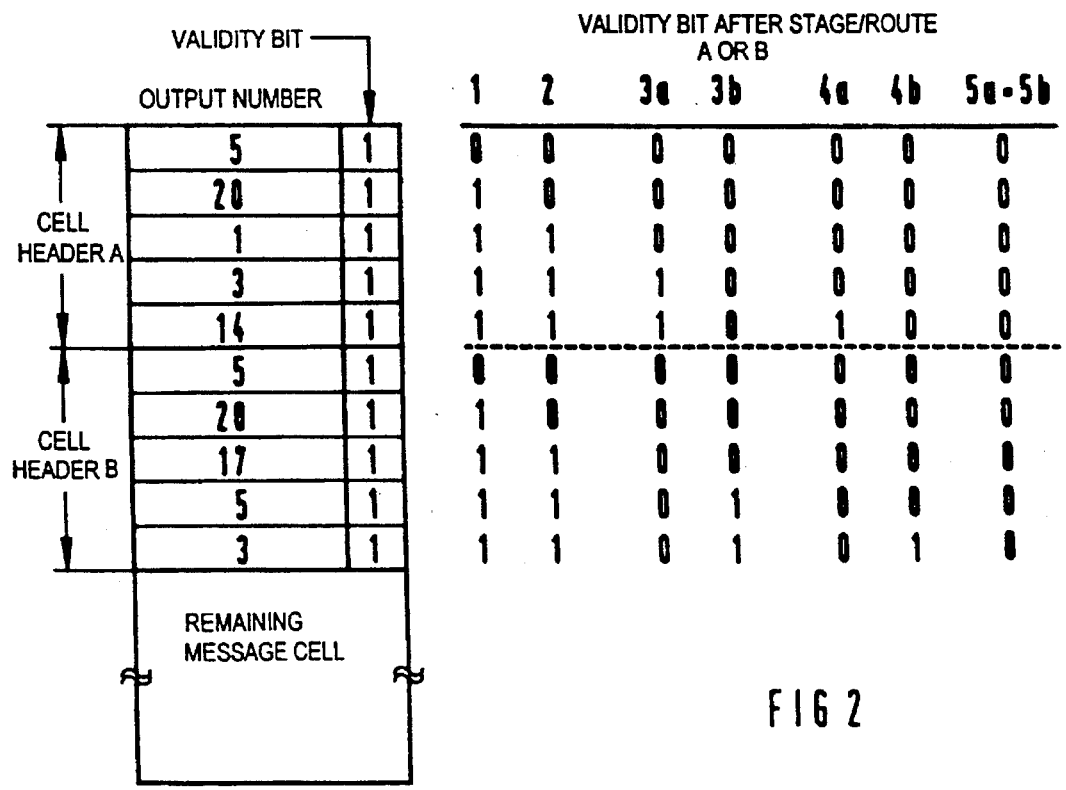
FIG. 2 shows the schematic structure of message cells according to the present invention.

As an example, FIG. 2 shows that case wherein a message cell is preceded by two internal cell headers A and B, whereby each of these internal cell headers comprises five header parts in order to forward the message cell within a five-stage switching network. The numeral indicated in the respective header part thereby indicates the output to be used in the respective switching stage. Over and above this, a validity bit is attached to every header part, this validity bit being initially set to the logical level "1". FIG. 4 is a flow chart of the inventive method in which the following method steps are illustrated. As derives from the illustrated example, the routing information contained in the first two header parts of the internal cell headers are identical (5, 20). The appertaining message cell is thus transmitted via the output 5 of the first switching stage and via the output 20 of the second switching stage to the third switching stage. The validity bits of these header parts are thereby destroyed. The header parts allocated to the third switching stage deviate from one another, so that the message cell is duplicated in this third switching stage. The two message cells resulting therefrom are subsequently forwarded via the outputs 1 and 17 of the third switching stage. The validity bit in the header part of the internal cell header A allocated to the third switching stage in the message cell forwarded via the route A (active path) is thereby destroyed and the validity bit in all header parts of the internal cell header B is also respectively destroyed. In a corresponding way, the validity bit in the header part allocated to the third switching stage in the message cell transmitted via the route B (alternate route) as well as in all header parts of the internal cell header A is respectively destroyed. Subsequently, the two message cells which proceeded from the duplication are forwarded in the remaining switching stages 4 and 5 only based on the criterion of the internal cell header provided for the respective route. The statuses of the validity bits for the individual header parts after stages 1–5 are shown again for the two routes A and B in the table in FIG. 2 shown in the right next to the message cell.

The above-explained control events also repeat in the transit switching networks CC and in the switching network CCb shown in FIG. 1. Since no duplication of message cells ensues in these switching networks given the assumed example, every arriving message cell is preceded by two identical internal cell headers. The forwarding of the message cells within the respective switching network then ensues based on the criterion of the identical header parts contained in the internal cell headers.

The above-explained procedure for transmitting message cells via separate routes, that is, via an active path and via an alternate route, yields the advantage that the individual message cells are only duplicated in that switching stage of a switching network where the two paths in fact branch. The load on the respective switching network due to the duplication of the message cells thus remains minimal.

Moreover, let is also be noted that the above-explained duplication of message cells can be realized in an especially simple way in a switching stage when a central memory ("shared memory") as well as output queues allocated thereto are provided within the individual switch elements of this switching stage. In this case, the respective message cell is deposited only once in the central memory and is read out twice, namely respectively when this message cell pends in the respective output queue as the next message cell for a transmission.

That case shall be discussed below wherein a malfunction occurs in the above-explained transmission of message cells over the active path of the path pair shown in FIG. 1, whereupon the message cells transmitted via this active path are to be discarded by the switching network CCb and the message cells supplied via the alternate path are to be forwarded via the interface means T3. According to a first exemplary embodiment, it is initially provided for this purpose that the interface means R2 lying in the active path is switched to transmission, whereas the message cells arriving via the interface means R3 lying in the alternate path are discarded. Given an interruption LGT of the active path, in FIG. 1, the transit switching network CCd following this interruption LGT inserts a signaling cell into the message cell stream that is transmitted to the switching network CCb and that is recognized therein. An alarm cell "VP-AIS" as defined according to CCITT Recommendation I.610, for example, can thereby be employed as the signaling cell. In response to the appearance of such a signaling cell, the switching network CCb inhibits the interface means R2 in the active path and the alternate path is through-connected via the interface means R3 using a control signal transmitted to this interface means R3.

In a further exemplary embodiment, the active path and the alternate path of the path pair shown in FIG. 1 are actively conducted up to the interface means T3 of the switching network CCb, that is, the message cells to be transmitted via the alternate path are only discarded at this location in the normal case. In addition, the plurality of message cells arriving via the active path and via the alternate path is separately and continuously acquired at this interface means. Due to differences in running time and due to the fluctuations in running time that are unavoidable in the asynchronous transfer mode, a difference between the acquired values will generally occur. In the normal case, however, this does not have arbitrarily high values. When, however, a disturbance in the form of, for example, an interruption appears on the active path, then the plurality of message cells calculated for the alternate path increases substantially compared to the plurality of message cells calculated for the active path. When the difference between these two values thereby exceeds a defined threshold, then the message cells still potentially arriving via the active path are discarded by the interface means T3, whereas the message cells arriving via the alternate path are forwarded. As a result of this procedure, the switching ensues substantially faster than the aforementioned switching using the interfaces R2 and R3.

Counting means are provided in the interface means T3 for the acquisition of the message cells transmitted via the active path and via the alternate path that was just set forth. These counting means can be formed of a counter allocated to the active path as well as a counter allocated to the alternate path whose momentary counter readings are supplied to a means for forming the difference between the momentary counter readings. Based on the criterion of the output signals output by this means, these output signals being dependent on the respective difference, a through-connection of the message cells transmitted via the active path or, respectively, via the alternate path then ensues. Alternatively thereto, the counting means can also be formed of a forward/backward counter whose momentary counter reading is changed in one direction with every appearance of a message cell transmitted via the active path, but is changed in the other direction with the appearance of a message cell transmitted via the alternate path. In this case, the forwarding of the message cells arriving via the active path or, respectively, via the alternate path ensues based on the criterion of the momentary counter reading of this forward/backward counter.

Regardless of the realization of the counting means, differences in counter reading or, respectively, momentary counter readings can occur after a longer time span without suitable control measures when message cells are transmitted with different cell loss probabilities via the active path and via the alternate path. The above-described monitoring mechanisms erroneously respond due to these differences in counter reading or, respectively, momentary counter readings. In order to preclude this, the switching network CCa in the present exemplary embodiment inserts synchronization cells into the message cell streams transmitted via the active path and via the alternate path at predetermined time intervals. With the appearance of these synchronization cells in the switching network CCb, the momentary counter reading of the aforementioned counting means is then set to a defined, initial value.

The following estimate is intended to serve for dimensioning the counting means as well as for defining the time intervals provided for the transmission of the synchronization cells. The difference in running time for the message cells to be transmitted within the ATM communication network is essentially established by the differences in the geometrical path lengths. A path length of 1000 km is surely a maximum value here, if one leaves satellite connections are not considered. A path length of 1000 km thereby corresponds to a running time of 4 ms. Values of approximately 300 µs are proposed for the maximum variation in running time given passage through a switching network. In the extreme case, the alternate path could proceed via ten switching networks and a path length of 1000 km, whereas the active path proceeds via a signal switching network, is lightly loaded and produces nearly no delay. The maximum difference in running time amounts to 7 ms, this corresponding to approximately 2500 cell cycles. When, for example, a virtual connection having a bit rate of 2 Mbit/s is involved, one message cell being sent approximately every 60 cell clocks on average, then it follows therefrom that the difference between the aforementioned counter readings for the two paths, that is, for the active path and for the alternate path, can amount to at most approximately 42. When a value of $10^{-5}$ is assumed as cell loss probability, then this is a relatively high value. Given this value, one message cell is, on average, lost after respectively 100,000 message cells, this corresponding to a time interval of 0.28 s. It does suffice to respectively insert a synchronization cell into the message streams at the spacing of a number of seconds. For example, the "performance monitoring" cells likewise already defined in CCITT Recommendation I.610 could thereby be employed as synchronization cells.

Figure 3:
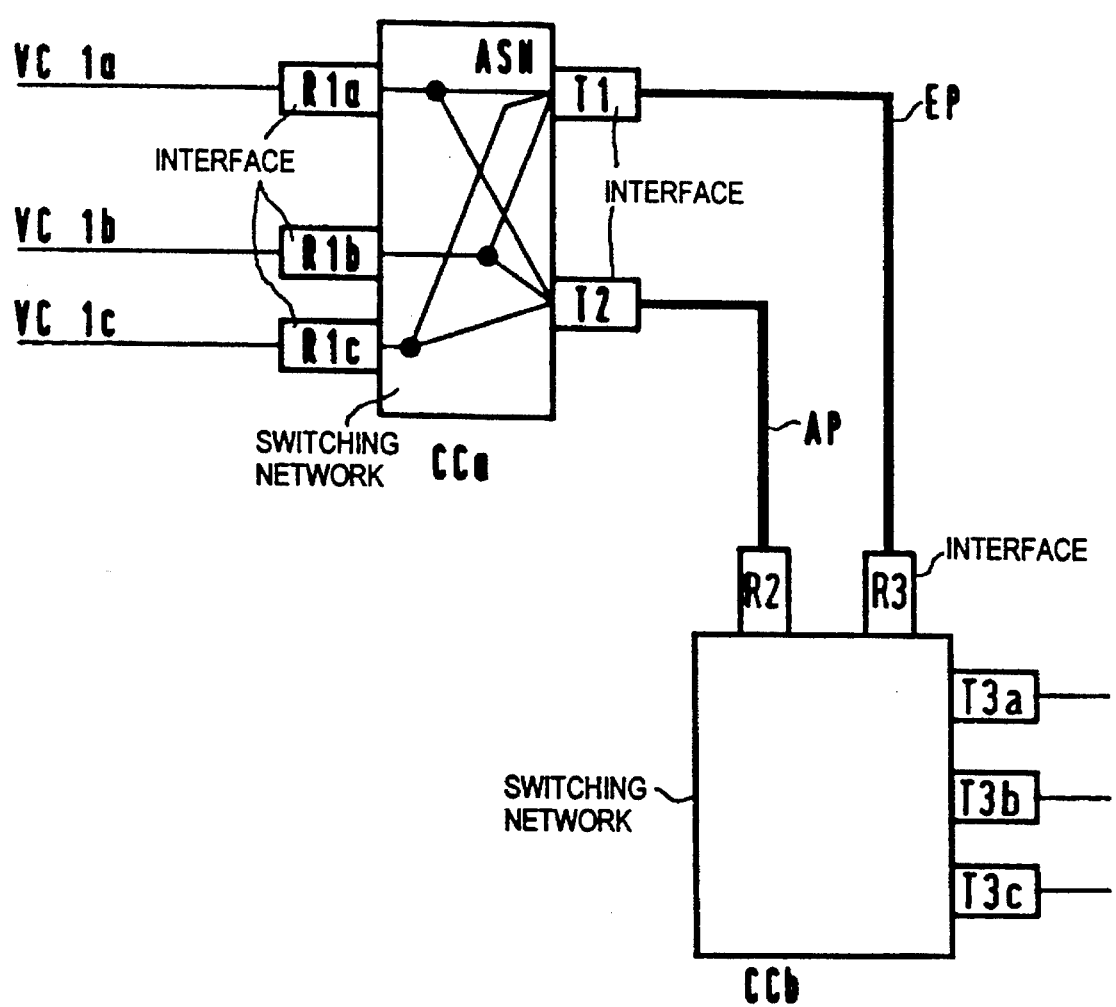
FIG. 3 is a schematic illustration showing two of the switching networks in FIG. 1 in which virtual paths are formed or cleared down.

The above-described methods can also be employed when the path pair shown in FIG. 1 is formed, for example, in the switching network CCa or, respectively, is in turn cleared down in the switching network CCb. An example of this is shown in FIG. 3 for the switching network CCa. As proceeds therefrom, the redundant path pair "active path AP and alternate path EP" is formed of three virtual connections VC1a, VC1b and VC1c. Message cells appearing during the course of these virtual connections are thereby supplied to the switching network CCa via interface means R1a, R1b and R1c. These message cells are duplicated in the switching network CCa according to the above-described principle. The redundancy is then in turn canceled in the switching network CCb in the interface means R2 and R3 shown in FIG. 1 or at three interface outputs T3a, T3b and T3c. The aforementioned counting means are thereby to be individually provided in these interface means for the respective virtual connection. Over and above this, the aforementioned synchronization cells are to be separately transmitted for each of the virtual connections.

In conclusion, let is also be pointed out that switching networks, via which the virtual connections belonging to a virtual path pair are initially set up during the course of a call setup, can also be provided as switching networks in the ATM communication network instead of "cross connects". Furthermore, the present invention can be employed not only for the transmission of message cells via an active path and via an alternate path allocated thereto, as set forth above, but also when message cells are to be respectively forwarded via different routes within an ATM communication network.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for transmitting message cells via redundant virtual path pairs, each of the path pairs formed of two separate paths of an asynchronous transfer mode (ATM) communication network having a plurality of multi-stage switching networks, message cells to be transmitted via a respective path pair being duplicated by a respective switching network located at a beginning of the respective path pair and the message cells allocated to one another being separately transmitted via the separate paths of the respective path pair, comprising the steps of:

providing with at least the respective switching network located at the beginning of the respective path pair a separate internal cell header, that precedes each of the message cells accepted by the respective switching network, for the two paths according to the cell header respectively belonging thereto, each of said separate internal cell headers having a plurality of header parts corresponding in number to the plurality of switching stages in a sequence of switching stages to be traversed within the respective switching network, a route through a respective switching stage being defined by a respective header part of said plurality of header parts;

attaching a respective validity bit to header parts of said plurality of header parts in each of the internal cell headers that precede each of the message cells to be transmitted, said validity bit being initially set to a defined logical level as a validity mark of a respective header part;

comparing, in each of the switching stages of the respective switching network, respective header parts of the plurality of header parts of internal cell headers that correspond to a respective switching stage and that are allocated to one another, given the appearance of a message cell;

forwarding, given an identity of the respective header parts that are compared to one another, the message cell based on the identical respective header parts;

duplicating, given a non-identity of the respective header parts that are compared to one another, the message cell, each of the two duplicated message cells resulting therefrom being separately forwarded according to one respective header part of the respective header parts that were compared to one another and, with this individual forwarding, further header parts following the one respective header part and belonging to the same internal cell header being retained unmodified, and the header parts of the other internal cell header being marked as invalid; and for each of the two duplicated message cells, only forwarding such message cell based on a remaining valid respective header part when one of the respective header parts that are compared to one another is marked as being invalid.

2. The method according to claim 1, wherein, following every comparison of two respective header parts that are allocated to one another, the respective switching stage marks these as being invalid.

3. The method according to claim 1, wherein each of said switching stages has at least one switch element having a central memory with an output queue allocated thereto, and wherein a message cells to be forwarded by a respective switch element of a switching stage are first intermediately stored in the central memory of the respective switch element; and wherein, given a required forwarding of a message cell via different routes, this message cell is respectively read out from the central memory when information, contained in the output queues and coming into consideration for the forwarding, indicate that the associated message cell is a next message cell to be forwarded.

4. The method according to claim 1, wherein said method is implemented in all switching networks located within each path of the respective path pair.

* * * * *